UNITED STATES PATENT OFFICE.

ROBERT DEMUTH, OF ELBERFELD, GERMANY, ASSIGNOR TO THE FARBENFABRIKEN OF ELBERFELD COMPANY, OF NEW YORK.

YELLOW-BROWN COTTON-DYE.

SPECIFICATION forming part of Letters Patent No. 606,193, dated June 28, 1898.

Application filed November 20, 1897. Serial No. 659,329. (Specimens.) Patented in England September 23, 1895, No. 17,738; in France January 15, 1896, No. 253,213, and in Italy March 31, 1896, XXXI, 40,624, LXXIX, 407.

*To all whom it may concern:*

Be it known that I, ROBERT DEMUTH, chemist, doctor of philosophy, residing at Elberfeld, Prussia, Germany, have invented a new and useful Improvement in the Manufacture of Brown Cotton-Dyes, (for which the Farbenfabriken, vormals Fr. Bayer & Co., of Elberfeld, Germany, has already obtained Letters Patent in England, No. 17,738, dated September 23, 1895; in France, No. 253,213, dated January 15, 1896, and in Italy, Reg. Gen., Vol. XXXI, No. 40,624, Reg. Att., Vol. LXXIX, No. 407, dated March 31, 1896;) and I do hereby declare the following to be an exact and clear description of my invention.

My invention relates to the production of a yellowish-brown cotton-dye by subjecting dinitrotoluenesulfo-acid,

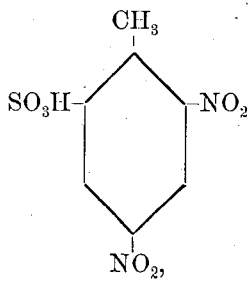

or salts thereof to the action of an alkaline-sulfid-carrying compound at elevated temperatures.

In order to carry out my process practically, I can proceed as follows, without limiting myself to the details given: Fifty parts, by weight, of dinitrotoluene-sulfonate of sodium are gradually introduced into a mixture prepared from one hundred and ninety-five parts, by weight, of dry sodium sulfid; one hundred parts, by weight, of flowers of sulfur, and one hundred and fifty parts, by weight, of boiling water, which mixture is kept stirred until the reaction setting in is finished. The resulting mass is then slowly heated in an iron vessel, profitably by means of a metallic bath, to about 200° centigrade, (temperature of the bath,) care being taken that the mixture is well stirred, and keeping the mass at the said temperature until it has become solid and can be easily pounded into a powder. The vessel is then closed and the temperature is raised to 250° centigrade, (temperature of the bath,) at which temperature heating is continued during from one to two hours. After cooling the melt is pounded, the product thus obtained being the finished dyestuff. It forms a dark-brown mass or powder readily soluble in water with a reddish-brown color, unalterable by the addition of sodium sulfid. From its solution in water it is separated by the addition of dilute hydrochloric or sulfuric acid as a brown precipitate, sulfureted hydrogen being liberated. It dyes unmordanted cotton in cold or hot baths, with or without the addition of alkaline sulfid, bright yellowish-brown shades fast against the action of alkalies and light.

The same result is obtained if in place of sodium sulfid and sulfur used in the above example other alkaline-sulfid-carrying compounds—such as sulfur and potassium sulfid, sulfur and soda, sulfur and potassa, sodium polysulfid, potassium polysulfid, or the like—are used.

Having now described my invention and in what manner the same is to be performed, what I claim as new, and desire to secure by Letters Patent, is—

1. The process for the production of a new yellowish-brown cotton-dye by subjecting dinitrotoluenesulfo-acid ($CH_3NO_2NO_2SO_3H$ 1:2:4:6) or salts thereof to the action of an alkaline-sulfid-carrying compound at elevated temperatures.

2. As a new article of manufacture the yellowish-brown cotton-dye producible from dinitrotoluenesulfo-acid or salts thereof, forming a dark-brown mass or powder, readily soluble in water with a reddish-brown color unalterable by the addition of sodium sulfid, being separated from its watery solution by the addition of dilute hydrochloric or sulfuric acid as a brown precipitate, while sulfureted hydrogen is set free, yielding on unmordanted cotton in cold and hot baths with or without the addition of alkaline sulfid bright yellowish-brown shades fast against the action of alkalies and light.

In testimony whereof I have signed my name in the presence of two subscribing witnesses.

ROBERT DEMUTH.

Witnesses:
R. E. JAHN,
OTTO KÖNIG.